United States Patent [19]

Leigh-Monstevens et al.

[11] Patent Number: 5,065,135
[45] Date of Patent: Nov. 12, 1991

[54] TRANSMISSION LOGIC CONTROLLING STARTER MOTOR AND BACKUP LIGHT

[75] Inventors: Keith V. Leigh-Monstevens, Troy; David C. Peterson, Walled Lake, both of Mich.

[73] Assignee: Automotive Products (USA) Inc., Auburn Hills, Mich.

[21] Appl. No.: 482,648

[22] Filed: Feb. 21, 1990

Related U.S. Application Data

[63] Continuation-in-part of Ser. No. 323,825, Mar. 15, 1989.

[51] Int. Cl.$^5$ .............................................. G08B 21/00
[52] U.S. Cl. .............................. 340/463; 123/179 K; 180/271
[58] Field of Search ................ 340/463; 180/271, 270; 123/179 K

[56] References Cited

U.S. PATENT DOCUMENTS

| | | | |
|---|---|---|---|
| 2,829,213 | 4/1958 | Brett | 340/463 |
| 2,911,620 | 11/1959 | Scherenberg | 340/463 |
| 3,410,970 | 11/1968 | Raab | 123/179 K |
| 4,033,311 | 7/1977 | Burson | 180/271 |
| 4,513,276 | 4/1985 | Kubota et al. | 123/179 K |

Primary Examiner—Glen R. Swann, III
Attorney, Agent, or Firm—Krass & Young

[57] ABSTRACT

Electric control apparatus for a motor vehicle including a push button module to indicate the operator choice of transmission state, an encoder tracking the annular position of the mode select shaft of the transmission and operative to provide a transmission state signal, and a logic module receiving the operator input request from the push button module, receiving a present transmission state signal from the encoder, and operating to shift the transmission to the requested position, provide enabling of the starter motor circuit in response to receipt of a neutral or park transmission state signal from the encoder, and energize the backup lamp circuit in response to receipt of a reverse transmission state signal from the encoder.

15 Claims, 4 Drawing Sheets

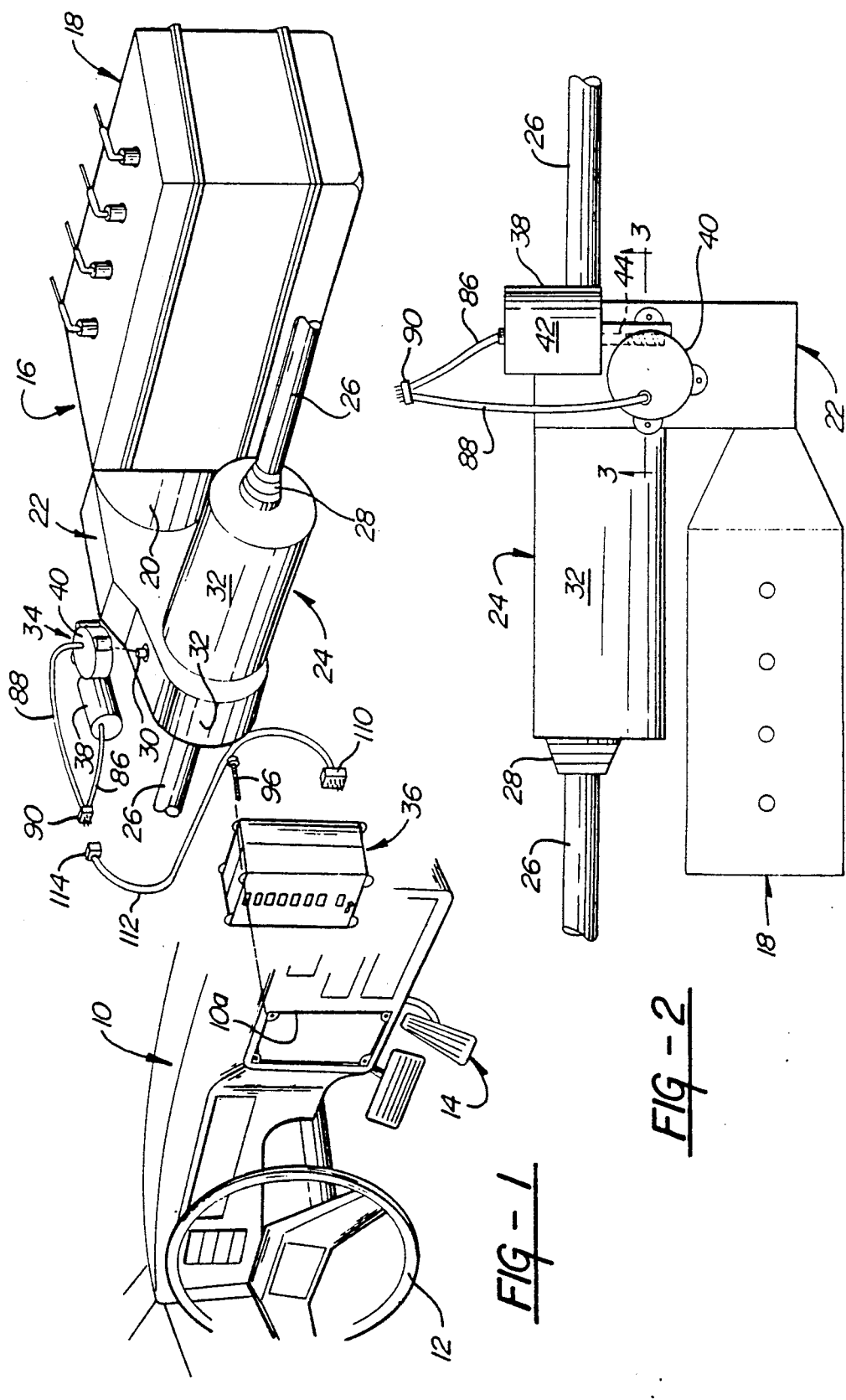

TRANSMISSION LOGIC CONTROLLING STARTER MOTOR AND BACKUP LIGHT

RELATED APPLICATION

This is a continuation-in-part of U.S. patent application Ser. No. 323,825 filed Mar. 15, 1989.

BACKGROUND OF THE INVENTION

This invention relates to electrical control apparatuses and more particularly to electric control apparatuses for controlling various functions of a motor vehicle.

Modern day motor vehicles typically include an automatic transmission in which the shifting is done in response to sensed speed and throttle opening parameters. A typical motor vehicle further includes backup lights which are automatically energized in response to placement of the transmission in a reverse mode and a starter motor which may be enabled only with the transmission in a neutral or park mode. Various control devices have been provided to selectively shift the transmission at the operator's command, to provide a neutral or park signal to enable starting of the engine of the motor vehicle, and to provide a reverse signal to provide energization of the backup lamp circuitry. Typically, the devices controlling the shifting of the transmission, the enabling of the starter motor circuit, and the energization of the backup lamp circuit have comprised separate devices and, as such, have been, in composite, rather expensive and prone to maintenance requirements.

SUMMARY OF THE INVENTION

This invention is directed to the provision of an improved electric control apparatus for a motor vehicle.

More specifically, this invention is directed to the provision of a control apparatus for selectively shifting the transmission of the vehicle and for simultaneously providing a starter enable signal for the vehicle as well as a backup lamp signal for the vehicle.

The electric control apparatus of the invention is intended for use with a motor vehicle of the type having a starter motor circuit and a transmission having a plurality of states including a "neutral" state. The invention control apparatus comprises a transmission-state sensing means for generating a plurality of present-transmission-state signals respectively indicating and corresponding to the various states of the transmission and means operative in response to receipt of a "neutral" transmission state signal to enable the starter motor circuit. This arrangement allows the utilization of the transmission-state sensing means typically forming a part of the electric shift apparatus to also be utilized to provide the "neutral" start signal to enable the starter motor circuit of the vehicle.

According to a further feature of the invention, the motor vehicle has a backup light circuit, the transmission has a "reverse" state, and the control apparatus further includes means operative in response to receipt of a "reverse" transmission-state signal to energize the backup light circuit. This arrangement allows the available transmission-state signal to be further utilized to energize the backup lamp in response to placement of the transmission in a "reverse" state.

According to a further feature of the invention, the operative means includes a logic control unit receiving the present-transmission-state signals from the sensing means and operative to enable the starter motor circuit in response to receipt of a "neutral" transmission-state signal from the sensing means and to energize the backup lamp circuit in response to receipt of a "reverse" transmission-state signal from the sensing means. This arrangement allows a common logic unit to be utilized in the control of the transmission as well as to provide a "neutral" start signal and a backup lamp signal.

According to a further feature of the invention, the transmission includes a mode select shaft operative in response to rotation thereof to selectively position the transmission in its various states and the transmission-state sensing means includes encoder means tracking the angular position of the mode select shaft and operative to generate a plurality of transmission-state signals for delivery to the logic control unit corresponding to respective angular positions of the mode select shaft related to respective states of the transmission. This arrangement provides a convenient means of determining the present state of the transmission for use in shifting the transmission as well as for use in providing a "neutral" start signal and a reverse backup lamp signal.

In the disclosed embodiment of the invention, the control apparatus includes an operator input means generating a desired transmission state signal corresponding to the manual operator input and a logic control unit interconnected between the operator input means and the transmission-state sensing means and operative to shift the transmission to the desired transmission state as indicated by the operator input means if the desired transmission state differs from the present transmission state as determined by the sensing means and further operative in response to receipt of a "neutral" transmission state signal to enable the starter motor circuit and still further operative in response to receipt of a reverse transmission state signal to energize the backup lamp circuit.

BRIEF DESCRIPTION OF THE DRAWINGS

FIG. 1 is a fragmentary perspective view of a front wheel drive motor vehicle embodying the invention electric control apparatus;

FIG. 2 is a fragmentary plan view of the front wheel drive assembly of the vehicle of FIG. 1;

DETAILED DESCRIPTION OF THE PREFERRED EMBODIMENT

Figure 3:
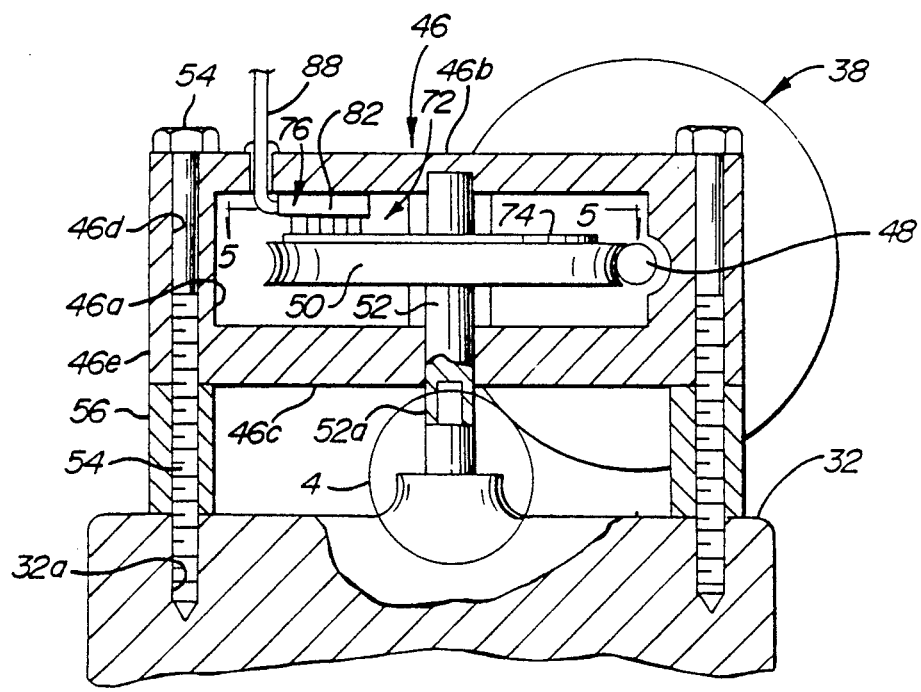
FIG. 3 is a view taken on line 3—3 of FIG. 2.

The invention electric control apparatus is seen schematically in FIG. 1 in association with a motor vehicle of the front wheel drive type and including an instrument panel assembly 10 positioned within the passenger compartment of the motor vehicle; a steering wheel 12 associated with the instrument panel; an accelerator pedal assembly 14; and a front wheel drive assembly 16.

Front wheel drive assembly 16 includes an internal combustion engine 18 mounted transversely in the engine compartment of the vehicle, a torque converter 20 driven by engine 18, a gear drive assembly 22, an automatic transmission 24, and drive shafts 26 drivingly connected to the opposite ends of transmission 24 by U joints 28. Transmission 24 includes a mode select shaft 30 having a free upper end positioned above the housing 32 of the transmission 24 and operable in known manner in response to rotation of the shaft to operate internal devices within the transmission to position the transmission in a plurality of transmission modes such as "park", "neutral", "drive", etc.

The invention electric control apparatus, broadly considered, comprises a power module 34 and a control module 36.

Power module 34 is adapted to be bolted to transmission housing 32 in proximity to mode select shaft 30 and control module 36 is adapted to be positioned in the instrument panel assembly 10 of the vehicle for convenient operator access.

Power module 34 is in the form of a motor assembly and includes a DC electric motor 38 and a speed reduction unit 40.

Motor 38 is a direct current motor having, for example, an output torque rating of 200 inch pounds and includes a housing 42 and an output shaft 44 as seen in FIG. 2.

Figure 4:
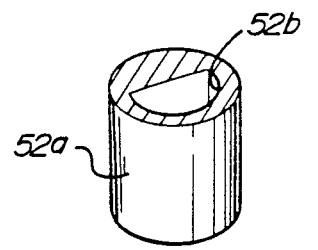
FIG. 4 is a fragmentary exploded perspective view of the structure within the circle 4 of FIG. 3.
Figure 5:
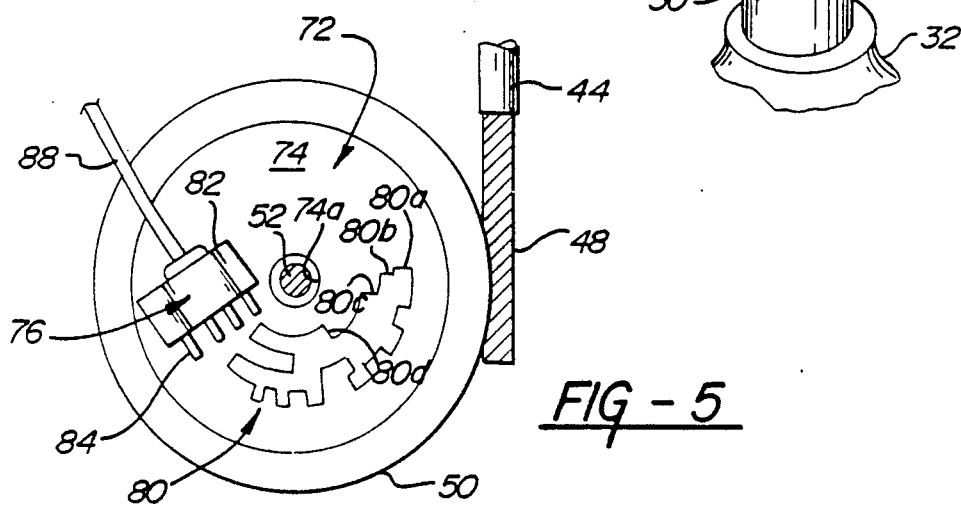
FIG. 5 is a view taken on line 5—5 of FIG. 3.

Speed reduction unit 40 (FIG. 3) includes a housing 46 fixedly secured to motor housing 42 and defining an internal cavity 46a, a worm gear 48 formed as a coaxial extension of motor output shaft 44 and extending into cavity 46a, a worm wheel 50 positioned in cavity 46a and driven by worm gear 48, and an output shaft 52 driven by worm wheel 50, journalled in housing walls 46b and 46c, and including a free lower end 52a positioned outside of and below housing wall 46c. Shaft lower end 52a includes a D shaped opening 52b for driving, coupling receipt of the D shaped upper end portion 30a of mode select shaft 30 (FIG. 4).

Motor assembly 34 is mounted on the upper face of transmission housing 32 by a plurality of bolts 54 passing downwardly through bores 46d in lug portions 46e of reduction unit housing 46 and downwardly through spacers 56 for threaded receipt in tapped bores 32a in transmission housing 32. In assembled relation, reduction unit output shaft 52 is coaxially aligned with mode select shaft 30, and D opening 52b in reduction shaft lower end 52a telescopically receives D shaped upper end 30a of mode select shaft 30 so that actuation of motor 38 acts through worm shaft 48, worm wheel 50, and reduction unit output shaft 52 to drive mode select shaft 30.

Power module 34 further includes an encoder assembly 72 operative to sense the instantaneous shift state or position of the transmission and generate an encoded signal representative of the sensed shift position.

Encoder assembly 72 includes an encoder wheel 74 and a pickup device 76. Encoder wheel 74 may be formed for example of a suitable plastic material and is secured to a side face of worm wheel 50 within reduction unit housing chamber 46a. Encoder wheel 74 includes a central aperture 74a passing speed reduction unit output shaft 52 and further includes code indicia 80 provided on the exposed outer face of the wheel and arranged along four arcuate tracks 80a, 80b, 80c and 80d centered on the center line of the encoder wheel.

Pickup device 76 includes a plastic body member 82 mounting a plurality of flexible resilient contact fingers 84 for respective coaction with indicia tracks 80a, 80b, 80c and 80d. In addition to the four fingers 84 for respective engagement with the four indicia racks, a fifth finger is provided to provide a ground for the system.

A lead 86 from motor 42 and a lead 88 from pickup device 76 are combined into a pin-type plug 90 (FIGS. 1 and 2).

Control module 36 is intended for ready installation in an opening 10a (FIG. 1) in instrument panel 10 by insertion of the module from the rear of the panel and fastening of the module within opening 10a by the use of several fasteners such as seen at 96. Module 36 (FIG. 6) includes a housing structure 98 of general box-like configuration enclosing an operator access or push button submodule 36a and a logic submodule 36b.

Push button submodule 30a includes a plurality of push buttons 100 positioned in vertically spaced relation in the front face 98a of the module housing and corresponding to the available transmission shift modes. Specifically, bottoms 100 include buttons corresponding to "park", "reverse", "neutral", "over-drive", "drive", "second" and "first" shift positions for the transmission. Buttons 100 coact in known manner with a printed circuit board 102 to generate suitable electrical signals in response to respective depression of the buttons 100.

Figure 7:
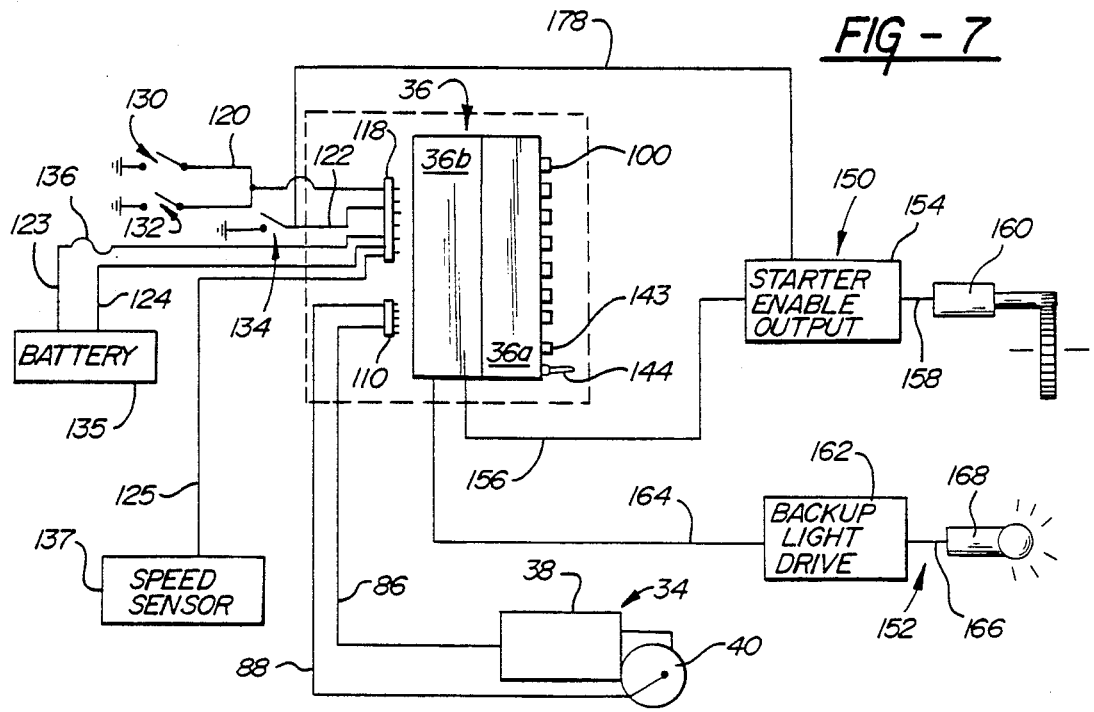
FIG. 7 is a circuit diagram for the invention electric control apparatus.

Logic submodule 36b includes an electronic printed circuit board 104 suitably electrically connected to printed circuit 102 and suitably mounting a first plurality of connector terminals 106 and a second plurality of connector terminals 108. Connector terminals 106 coact with a pin-type plug 110 at the end of a cable 112. Cable 112 includes a plug 114 (FIG. 1) at its remote end for plugging receipt of plug 90 so that plug 110 embodies the information from leads 86 and 88. Connector terminals 108 coact with a pin-type plug 118. Plug 118 embodies the information from leads 120, 121, 122, 123, 124, and 125 as seen in FIG. 7.

Lead 120 is associated with a switch 130 sensing the open or closed position of the driver's door of the vehicle; lead 121 is associated with a switch 132 sensing the presence or absence of a driver on the driver's seat of the vehicle; lead 122 senses the open or closed condition of the ignition switch 134 of the vehicle; leads 123 and 124 are connected to the negative and positive terminals of the vehicle battery 135 with a suitable fuse 136 in lead 123; and lead 125 is connected to a speed sensor 137 which provides information with respect to the instantaneous speed which the vehicle is traveling.

The invention electric shift assembly is delivered to the vehicle manufacturer in the form of power module 34 and control module 36. During the assembly of the vehicle, the power module 34 is mounted on the transmission housing 32 in coupling relation to mode select shaft 30 and the control module 36 is mounted in the instrument panel 10, whereafter plug 90 is plugged into plug 114 and plugs 110 and 118 are plugged into control module 36 to complete the assembly of the electric shift assembly.

The mounting of power module 34 on the transmission housing is accomplished simply by positioning the lower end 52a of reduction shaft 52 over the upper end 30a of mode select shaft 30 and passing bolts 54 downwardly through bores 46d and spacers 56 for threaded engagement with tapped bores 32a in transmission housing 32.

Installation of control module 36 in instrument panel 10 is effected simply by moving the control module from the rear of the panel into the opening 10a and fastening the module in place by the use of fasteners 96 or the like. Following the plugging of plug 90 into plug 114 and the plugging of plugs 110 and 118 into connector terminals 106 and 108, the system is operational for shifting the transmission.

Figure 6:
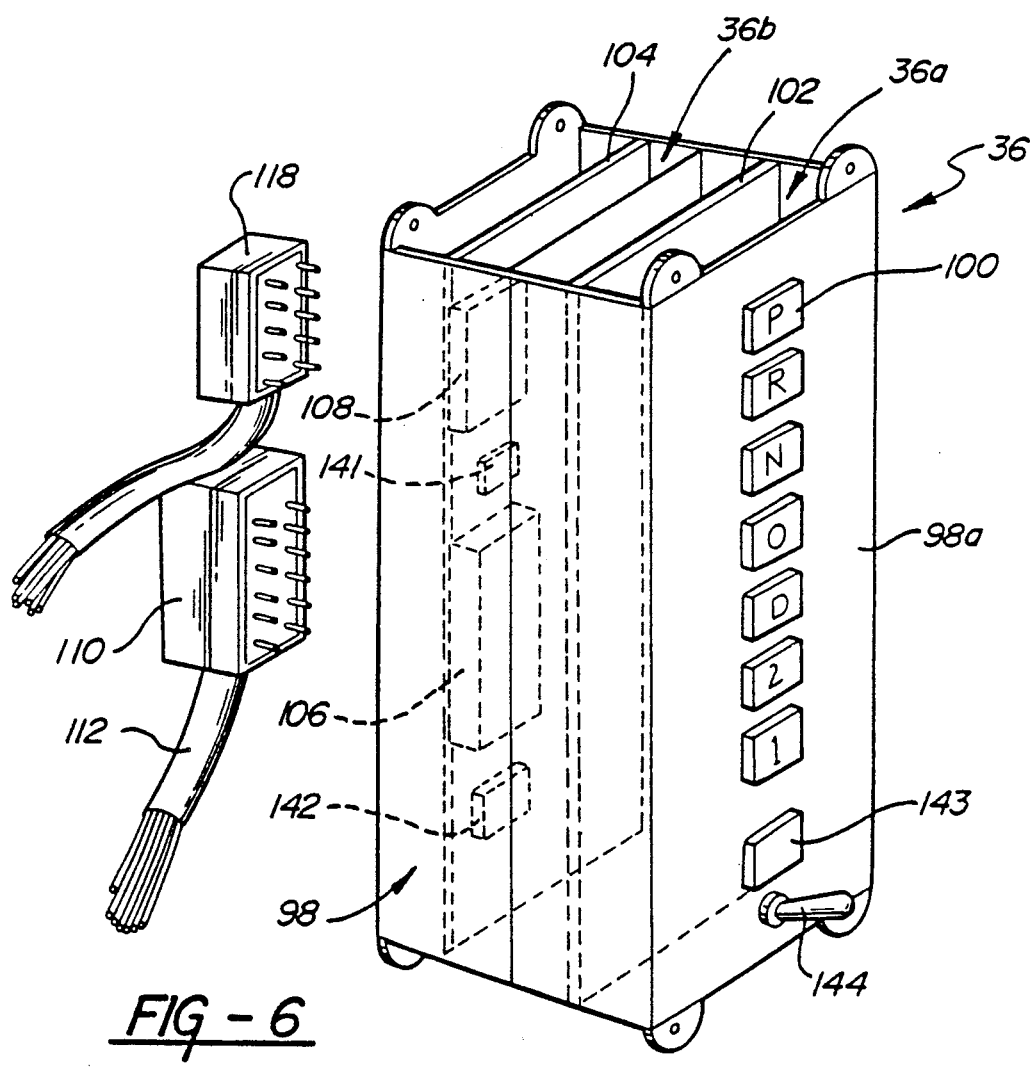
FIG. 6 is a fragmentary perspective view of a control module employed in the invention electric shift apparatus.

In use, various input signals, such as described above and illustrated in FIG. 7, are supplied to a logic chip 141, which may be a programmable logic array or a gate array. Logic chip 141 is configured to receive these input signals and generate the necessary drive signals to motor 38 via a buffer 142 for providing the selection of the desired gear (FIG. 6). The various input signals are formed into a set of logic signals.

Logic chip 141 serves to compare the inputs indicating the depressed push button with the inputs indicating the present gear. If they differ, then logic chip 141 generates an output signal to motor 38 to rotate the motor until the present gear matches the selected gear. This process includes an indication of which shifts are upshifts and which are downshifts according to Boolean equations.

As soon as the instantaneous encoder signal transmitted by pickup device 76 matches the signal generated by the specific depressed push button, the comparator logic of control module 36 functions to deenergize and brake the motor so that the mode select shaft 30, and thereby the transmission, is stopped precisely in the selected shift position.

The manner in which the various input signals are formed into a set of logic signals, the specific Boolean equations employed, and the manner in which the control system functions to receive an input or request signal, compare it to the present transmission state signal, and suitably energize the motor to shift the transmission to the desired state, are explained in further detail in U.S. Pat. Nos. 4,841,793, 4,790,204, 4,817,471, and 4,922,769, all assigned to the assignee of the present application.

The circuit diagram seen in FIG. 7 further includes a starter motor circuit 150 and a backup light circuit 152.

Starter motor circuit 150 includes a starter enable output 154, a lead 156 connected between the starter enable output 154 and the logic submodule 36b, and a lead 158 connected between the starter enable output 154 and the starter motor 160 of the motor vehicle.

Backup light circuit 152 includes a backup light drive 162, a lead 164 connected between the backup light drive 162 and logic submodule 36b, and a further lead 166 connected between backup drive 162 and the backup lamp 168 of the motor vehicle.

Figure 8:
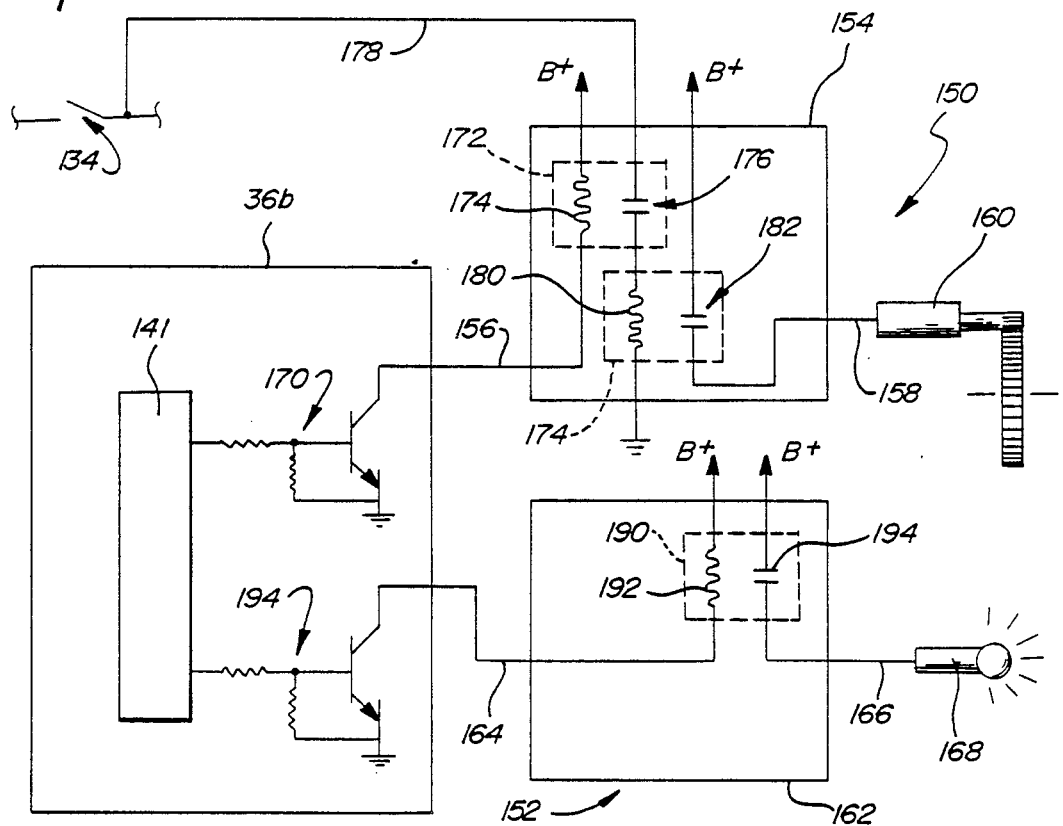
FIG. 8 shows further circuit detail of the circuit diagram shown in FIG. 7.

With reference now to FIG. 8, lead 156 is connected to an open collector output 170 positioned within logic submodule 36b and connected to logic chip 141. Starter enable output 154 includes a first relay 172 and a second relay 174. The coil 174 of first relay 172 is connected to lead 156 and to the positive battery terminal, and the contacts 176 of first relay 172 are connected at one side to a lead 178 extending from the ignition switch 134 of the motor vehicle.

The coil 180 of second relay 174 is connected to the other side of the contacts 176 of first relay 172 and to ground and the contacts 182 of second relay 174 are connected between battery positive and lead 158 to starter motor 160.

Logic chip 141, upon receipt of a "neutral" or "park" signal from encoder assembly 172 acts through open collector output 170 and through coil 174 of relay 172 to enable the starter motor circuit and, specifically, acts to close contacts 176 so that upon movement of ignition switch 134 to a start position a circuit is completed through coil 180 of relay 174 to close contacts 182 of relay 174 to provide a high current circuit from the positive battery terminal to starter motor 160 via lead 158 to allow starting of the vehicle. The described circuitry operates to maintain the starter motor circuit enabled for so long as chip 141 continues to receive a neutral or a park signal from the encoder assembly 72. As soon as the encoder assembly indicates a transmission state other than park or neutral, the logic submodule operates to deenergize the relay 174 and disenable the vehicle starter motor circuit.

Backup light drive 162 includes a relay 190. The coil 192 of relay 190 is connected via lead 164 to an open collector output 194 within logic submodule 36b and connected to logic chip 141. The other side of coil 192 is connected to positive battery. The contacts 194 of relay 190 are connected between positive battery and lead 166.

When logic chip 141 receives a reverse signal from encoder assembly 72 the chip operates through open collector output 194 and via lead 164 to energize coil 192 of relay 190 and thereby close contacts 194 to close a circuit between the battery and backup lamp 168 via lead 166. The logic chip continues to energize relay 190 and maintain contacts 194 in a closed position so long as a reverse transmission state signal is being received from encoder assembly 72 and, conversely, acts to deenergize relay 190 and open contacts 194, thereby breaking the circuit to the backup lamp, when the encoder input to logic chip 141 indicates a transmission state other than reverse.

The invention electric control apparatus will be seen to provide a compact, efficient and inexpensive mechanism for providing automatic shifting of a transmission in response to operator input, for providing a neutral start signal to enable the starter motor circuit, and for providing a reverse signal to energize the backup lamp circuit.

Whereas a preferred embodiment of the invention has been illustrated and described in detail, it will be apparent that various changes may be made in the disclosed embodiment without departing from the scope or spirit of the invention.

We claim:

1. An electric control apparatus for use with a motor vehicle of the type having a starter motor circuit and an automatic transmission having a plurality of states including a "neutral" state, said apparatus comprising:

encoder means operative to generate a plurality of encoded signals respectively indicating and corresponding to the various states of the automatic transmission;

a logic chip receiving said encoded signals as input signals and operative to generate logic output signals corresponding to the various states of the automatic transmission; and means operative in response to receipt of a "neutral" transmission state signal from the logic chip to enable the starter motor circuit.

2. An electric control apparatus according to claim 1 wherein the motor vehicle has a backup light circuit and the transmission has a "reverse" state and wherein said apparatus further includes:

means operative in response to receipt of a "reverse" transmission-state signal from the logic chip to energize the backup light circuit.

3. An electric control apparatus according to claim 1 wherein the transmission includes the further state of "park" and wherein:
   said operative means are further operative in response to receipt of a "park" transmission-state signal from the logic chip to enable the starter motor circuit.

4. An electric control apparatus for use with a motor vehicle of the type having a backup light circuit and a transmission having a plurality of states including a "reverse" state, said apparatus comprising:
   encoder means operative to generate a plurality of encoded signals respectively indicating and corresponding to the various states of the transmission;
   a logic chip receiving said encoded signals as input signals and operative to generate logic output signals corresponding to the various states of the transmission; and
   means operative in response to receipt of a "reverse" transmission state signal from said logic chip to energize the backup light circuit.

5. An electric control apparatus according to claim 4 wherein the motor vehicle has a starter motor circuit and the transmission has a "neutral" state and wherein said apparatus further includes:
   means operative in response to receipt of a "neutral" transmission-state signal from said logic chip to enable the starter motor circuit.

6. An electric control apparatus for use with a motor vehicle of the type including a backup light circuit, a starter motor circuit, and a transmission having a plurality of states including a "neutral" state, a "park" state, and a "reverse" state, said apparatus comprising:
   encoder means operative to generate a plurality of encoder signals respectively indicating and corresponding to the various states of the transmission;
   a logic chip receiving said encoder signals as input signals and operative to generate logic output signals corresponding to the various states of the transmission; and
   means receiving said transmission state signals from said logic chip and operative in response to receipt of a "neutral" or a "park" transmission state signal to enable the starter motor circuit and operative in response to receipt of a "reverse" transmission state signal to energize the backup light circuit.

7. An electric control apparatus for a motor vehicle of the type having a transmission having a plurality of states including a "neutral" state and a "park" state, said apparatus comprising:
   a starter motor circuit;
   an ignition switch operative to energize said starter motor circuit with said circuit enabled;
   encoder means operative to generate encoded signals corresponding to the various states of the transmission;
   a logic control unit receiving the encoded transmission-state signals from said encoder means and operative in response to receipt of a "neutral" or "park" transmission-state signal to enable said starter motor circuit to allow energization of said starter motor circuit upon actuation of said ignition switch.

8. An electric control apparatus for use with a motor vehicle of the type having a starter motor circuit and a transmission having a plurality of states including a "neutral" state, said apparatus comprising:
   an operator input means for generating a desired transmission-state signal corresponding to manual operator input;
   a transmission-state sensing means for generating a present transmission-state signal indicative of the state of the transmission; and
   electric control means connected to said operator input means and to said transmission-state sensing means and operative to shift the transmission to the desired transmission-state as indicated by operator input if the desired transmission-state differs from the present transmission-state as determined by said sensing means and further operative in response to receipt of a "neutral" transmission-state signal to enable the starter motor circuit.

9. An electric control apparatus according to claim 8 wherein the motor vehicle has a backup light, the transmission has a "reverse" state, and said electric control means is further operative in response to receipt of a "reverse" transmission-state signal to energize the backup light circuit.

10. An electric control apparatus according to claim 9 wherein:
    said electric control means includes a logic control unit receiving the present transmission-state signals from said sensing means and receiving the desired transmission-state signals from said operator input means; and
    said electric control means is operative to shift the transmission to the desired transmission-state as indicated by the desired transmission-state signal received by the logic control unit if the desired transmission-state differs from the present transmission-state.

11. An electric control apparatus according to claim 10 wherein the transmission includes a mode select shaft operative in response to rotation thereof to selectively position the transmission in its various states and wherein the transmission-state sensing means includes encoder means tracking the annular position of the mode select shaft and operative to generate a plurality of transmission-state signals for delivery to said logic control unit corresponding to respective angular positions of the mode select shaft related to respective states of the transmission.

12. An electric control apparatus according to claim 11 wherein the motor vehicle has a backup light circuit and the transmission has a "reverse" state and wherein the electric control means is further operative in response to receipt of a "reverse" transmission-state signal to energize the backup light circuit.

13. An electric control apparatus for use with a motor vehicle of the type having a starter motor circuit and an automatic transmission having a plurality of states including a "neutral" state, said apparatus comprising:
    a transmission-state sensing means for generating a plurality of present transmission-state signals respectively indicating and corresponding to the various states of the automatic transmission; and
    means operative in response to receipt of a "neutral" transmission-state signal to enable the starter motor circuit;
    said operative means including a logic control unit receiving the present transmission-state signals from said sensing means and operative to enable the starter motor circuit in response to receipt of a "neutral" transmission-state signal from said sensing means;

said transmission including a mode select shaft operative in response to rotation thereof to selectively position the transmission in its various states;

said transmission-state sensing means including encoder means tracking the annular position of the mode select shaft and operative to generate a plurality of transmission-state signals for delivery to said logic control unit corresponding to respective angular positions of the mode select shaft related to respective states of the transmission.

14. An electric control apparatus for use with a motor vehicle of the type including a backup light circuit, a starter motor circuit, and a transmission having a plurality of states including a "neutral" state, a "park" state, and a "reverse" state, said apparatus comprising:

- a transmission state sensing means for generating a plurality of present transmission-state signals respectively indicating and corresponding to the various states of the transmission; and
- means receiving said transmission-state signals and operative in response to receipt of a "neutral" or a "park" transmission-state signal to enable the starter motor circuit and operative in response to receipt of a "reverse" transmission-state signal to energize the backup light circuit;

said operative means including a logic control unit receiving the present transmission-state signals from the sensing means and operative in response to receipt of a "park" or "neutral" transmission-state signal to enable the starter motor circuit and operative in response to receipt of a "reverse" transmission-state signal to energize the backup light circuit.

15. An electric control apparatus according to claim 14 wherein the transmission includes a mode select shaft operative in response to rotation thereof to selectively position the transmission in various states and wherein:

said transmission-state sensing means includes encoder means tracking the annular position of the mode select shaft and operative to generate a plurality of transmission-state signals for delivery to said logic control unit corresponding to respective angular positions of the mode select shaft related to the respective states of the transmission.

* * * * *